UNITED STATES PATENT OFFICE.

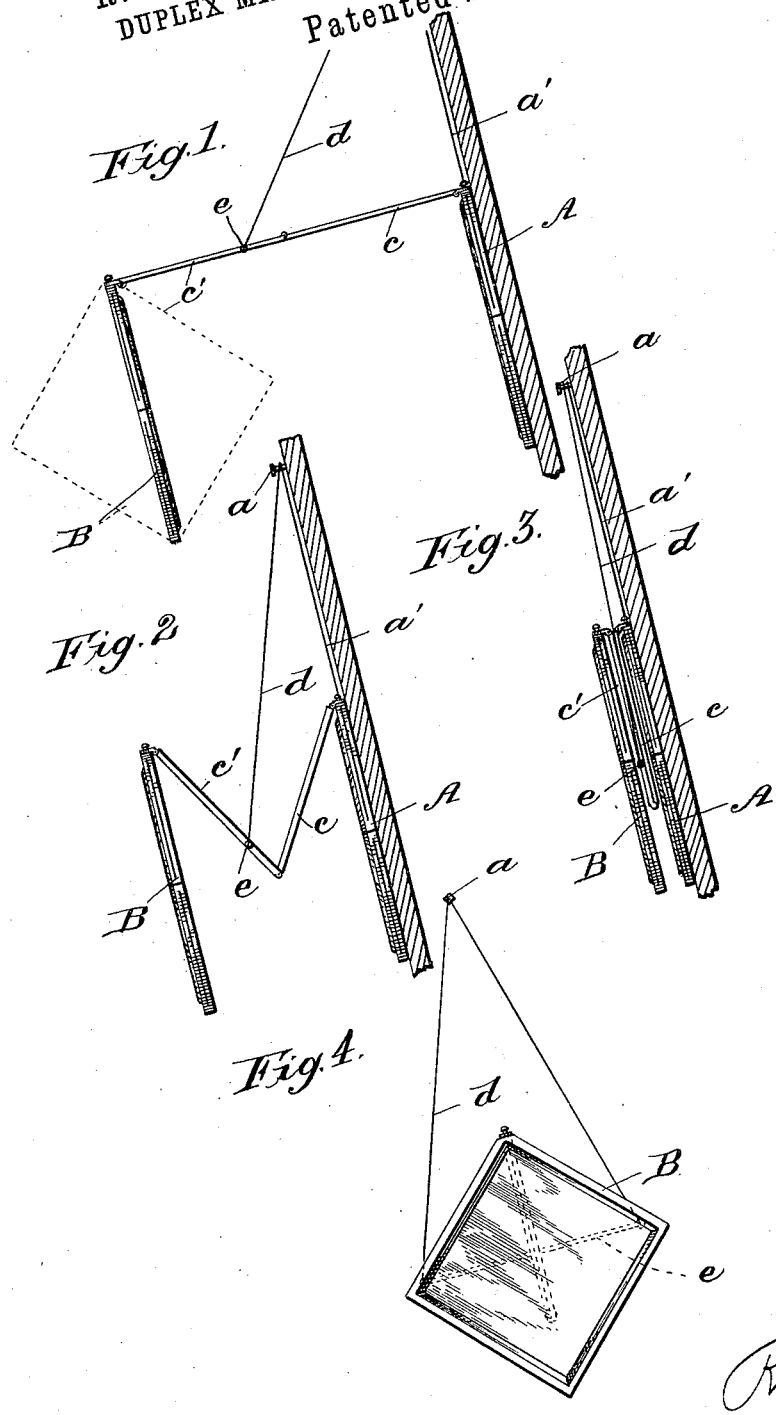

ROBERT F. PICKENS, OF DELHI, MISSOURI.

DUPLEX MIRROR.

SPECIFICATION forming part of Letters Patent No. 567,163, dated September 8, 1896.

Application filed January 11, 1896. Serial No. 575,074. (No model.)

*To all whom it may concern:*

Be it known that I, ROBERT F. PICKENS, a citizen of the United States, residing at Delhi, in the county of Crawford and State of Missouri, have invented certain new and useful Improvements in Duplex Mirrors, of which the following is a specification, reference being had therein to the accompanying drawings.

My invention relates to that class of duplex mirrors which when not in use as double mirrors are adapted to be folded against each other and in such a way that one of said mirrors may be used as an ordinary single mirror. To this end, I provide two mirrors which are similar in size and shape and which are joined together at their tops by a folding jointed connection which permits the outer of said mirrors to be removed from the inner one a proper distance to enable a person standing between them to obtain double or reflected views of himself or herself. The inner mirror is to be attached to the wall or suspended from a proper support attached thereto, and from the same support extends a cord or other suspending device, which is attached to the outer part of the jointed connection between the two mirrors and which will suspend the outer mirror when the same is in folded position, or will assist in suspending the same when it is removed from the inner mirror to a position enabling a person using the same to get any desired views. The outer mirror is joined to the folding connection by a vertical pivot or swivel connection, so that it may be turned to face the inner mirror when the two are to be used as duplex mirrors, or may be turned to face outward when folded against the stationary or inner mirror, so as to be in proper position for use as an ordinary single mirror supported against the wall.

In the accompanying drawings, Figure 1 illustrates my invention with the mirrors in position to be used as duplex mirrors. Fig. 2 shows the same partly folded, and Fig. 3 shows the same in a completely-folded position. Fig. 4 is a front view also illustrating the mirrors in folded position.

A denotes the inner or stationary mirror, which may be permanently attached to the wall or other vertical support, or may be suspended from a nail $a$ or other suitable similar device by means of a cord $a'$.

B denotes the outer or movable mirror, which is joined to the stationary or inner mirror A by means of a jointed connection consisting of two folding leaves or links $c$ and $c'$, which are hinged to said mirrors at their tops midway their width and are connected together by a "rule-joint" which enables them to fold together in one position, but which limits their movement when the movable mirror is opened out or removed from the stationary mirror, so that they may be brought merely into a straight line with each other, these links being properly hinged to the tops of the mirrors A and B, so as to enable them to fold as indicated. The movable mirror B is also connected with the outer link $c'$ by a vertical pivot which enables the said mirror to be turned around horizontally, so as to face the stationary mirror when opened out therefrom, or to be reversed to bring its face outward when folded against the stationary mirror.

The link $c'$, forming part of the jointed connection between the two mirrors, is preferably provided between its ends with a crossbar $e$, to which is attached the lower ends of a cord or other suitable suspending device $d$, extending downward from the nail or support $a$, sustaining the stationary mirror.

The cord or suspending device $d$ is of proper length to sustain the mirror B on a level with the mirror A when the two are folded together, and will also serve to partly support the same when the said mirror B is removed from the mirror A by the user.

In the use of my invention the user, desiring to get double reflections, merely takes hold of mirror B and moves it outward from the mirror A to the position denoted in Fig. 1, and having reversed the said mirror B, so that it faces the mirror A, the user can obtain any desired duplex views of himself or herself. In folding the mirror together the user merely reverses the mirror B to bring its face outward and then breaks down the jointed connection, so as to start it into folding position, and finally brings the outer mirror inward against the inner mirror to the folded position denoted in Figs. 3 and 4.

It will be seen that the centrally-disposed connecting-links $c$ $c'$ and the cross-bar $e$ lie entirely between the two mirrors and are wholly concealed when the mirror B is brought to its folded position.

I am aware that a duplex mirror having a folded connection is not new, broadly, but such mirrors as heretofore constructed are more expensive to make than the simple invention hereinbefore described and hereinafter claimed.

Having thus described my invention, I claim and desire to secure by Letters Patent—

1. In a duplex mirror, the combination with the stationary mirror A, of a movable mirror B, connecting-links $c$, $c'$ hinged to said mirrors and adapted to fold in one direction only, a swivel connection between said movable mirror B and outer link $c'$, a cross-bar $e$ on said outer link $c'$, and a suspending cord or device attached to said cross-bar, said connecting-links and cross-bar lying wholly between said stationary mirror A and movable mirror B and being entirely concealed when the mirror is in folded position.

2. In a duplex mirror, the combination with the stationary mirror A, of the movable mirror B, the centrally-arranged connecting-links $c$, $c'$, hinged to the tops of said mirrors at their middles, said links being joined by a rule-joint so as that they fold in one direction only, a swivel connection between said movable mirror B and outer link $c'$, a cross-bar $e$ rigidly secured to said outer link $c'$, and a suspending cord or device attached to said cross-bar to support said mirror B in its different positions, said connecting-links and cross-bar lying between said mirrors and being wholly concealed between the two when the duplex mirror is closed.

In testimony whereof I affix my signature in presence of two witnesses.

ROBERT F. PICKENS.

Witnesses:
J. M. PICKENS,
M. S. PICKENS.